T. WENSEL.
PROCESS OF PRODUCING ILLUSTRATIONS.
APPLICATION FILED JUNE 24, 1912.
1,217,250.
Patented Feb. 27, 1917.
4 SHEETS—SHEET 1.
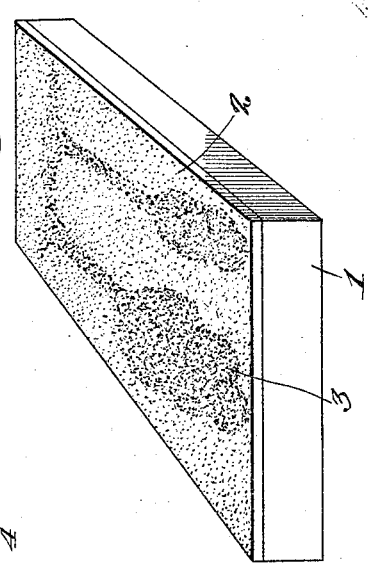
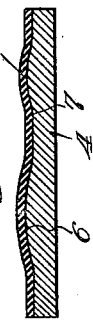
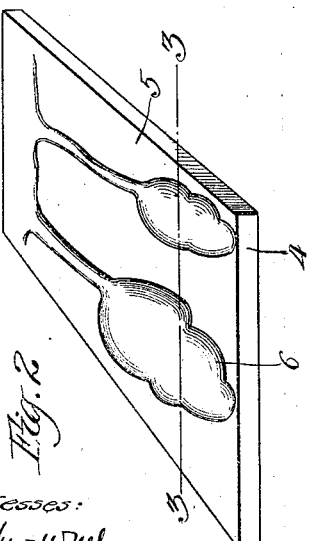
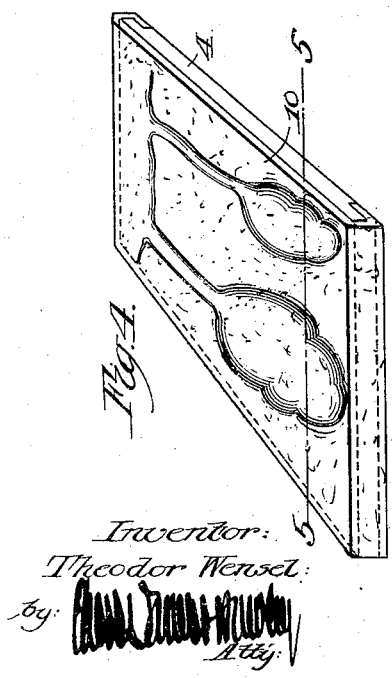
Witnesses:
Arthur W. Nelson
Earl E. Howe
Inventor:
Theodor Wensel
by 
Atty.

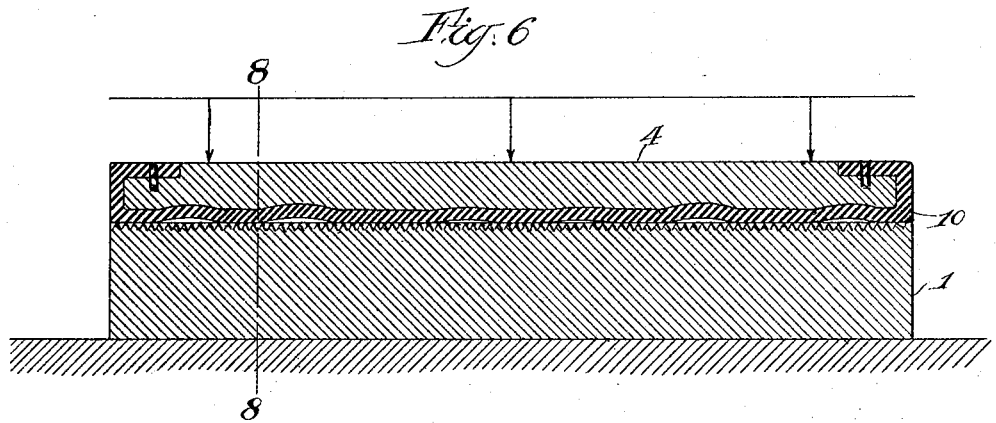
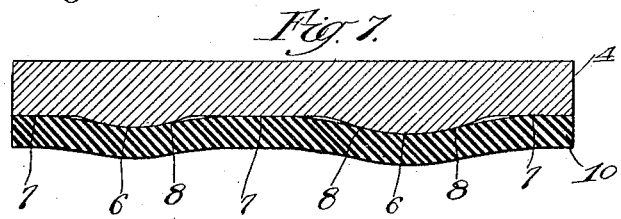
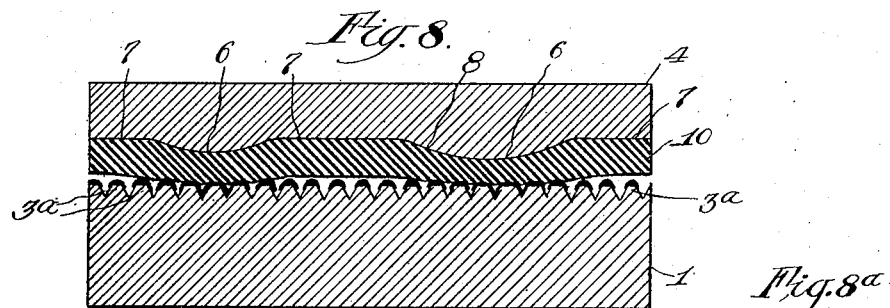
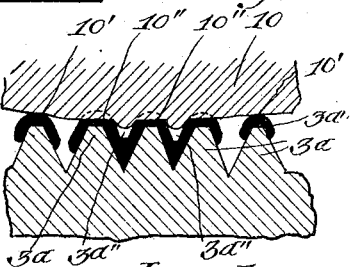
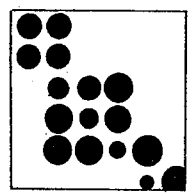
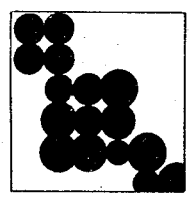
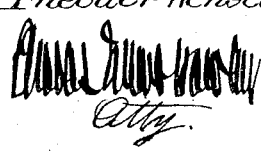

T. WENSEL.
PROCESS OF PRODUCING ILLUSTRATIONS.
APPLICATION FILED JUNE 24, 1912.
1,217,250.
Patented Feb. 27, 1917.
4 SHEETS—SHEET 3.
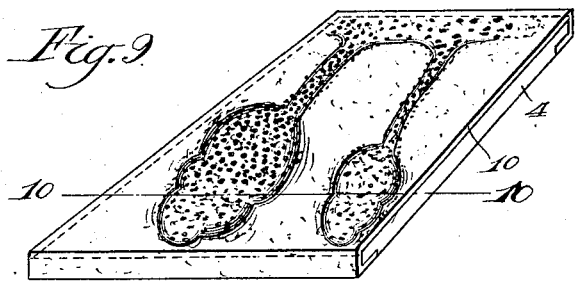
Fig. 9
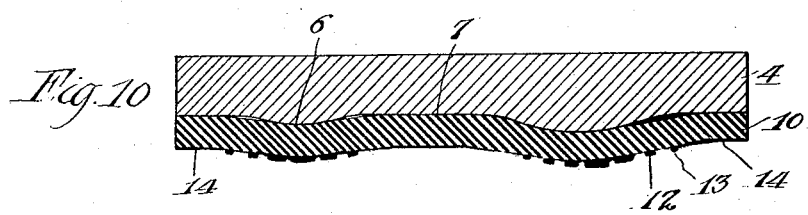
Fig. 10
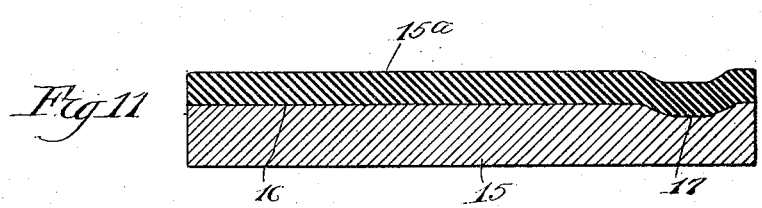
Fig. 11
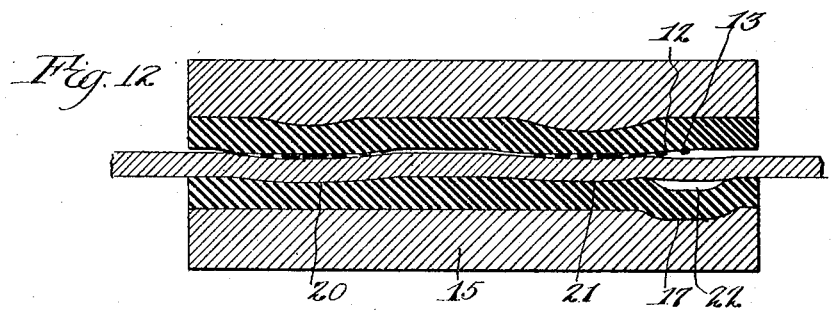
Fig. 12
Fig. 13
Witnesses:
Inventor:
Theodor Wensel
by 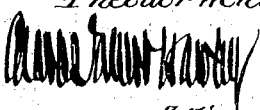
Atty T. WENSEL.
PROCESS OF PRODUCING ILLUSTRATIONS.
APPLICATION FILED JUNE 24, 1912.
1,217,250.
Patented Feb. 27, 1917.
4 SHEETS—SHEET 4.
Fig. 16.
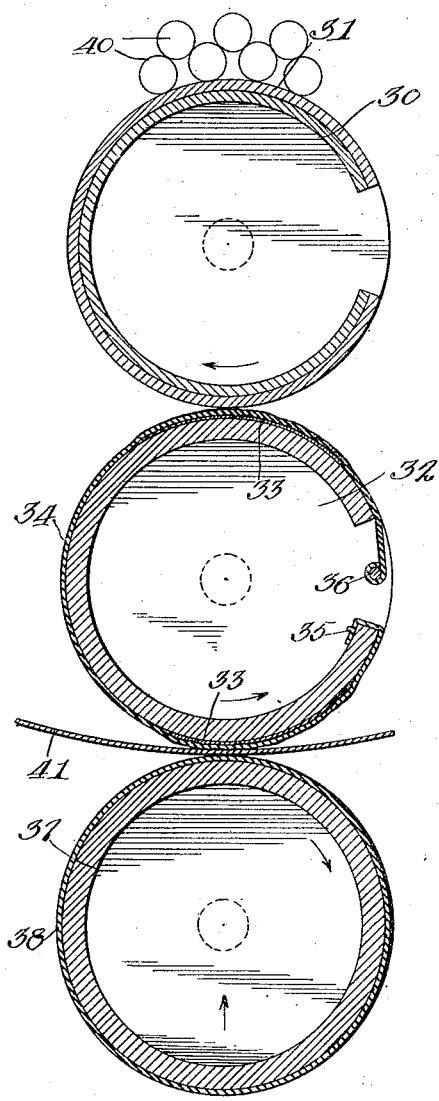
Fig. 17.
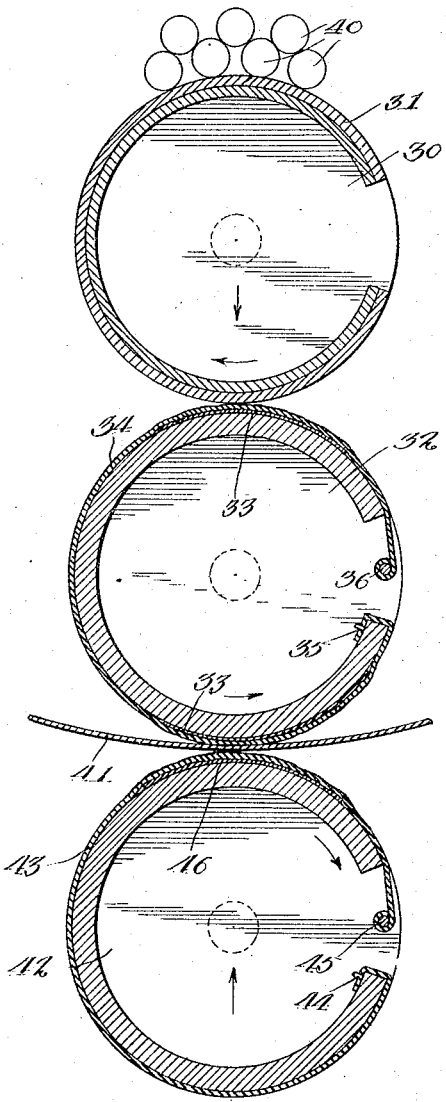
Witnesses:
Arthur W Nelson
Earl E. Howe
Inventor:
Theodor Wensel
Atty.

UNITED STATES PATENT OFFICE.

THEODOR WENSEL, OF JOLIET, ILLINOIS.

PROCESS OF PRODUCING ILLUSTRATIONS.

1,217,250.

Specification of Letters Patent.

Patented Feb. 27, 1917.

Application filed June 24, 1912. Serial No. 705,678.

*To all whom it may concern:*

Be it known that I, THEODOR WENSEL, a citizen of the United States, and a resident of Joliet, county of Will, and State of Illinois, have invented certain new and useful Improvements in Processes of Producing Illustrations, of which the following is a specification.

My invention relates to improvements in the art of printing and particularly in the art of printing pictures and the like from printing plates.

There are numerous processes of printing, but they all consist in covering arbitrarily placed picture surfaces with ink and subsequently transferring the ink to paper, cloth, and the like by pressure. There are several classes of printing plates, one of which is a surface plate, characterized by plates used in lithography, a second of which is a relief plate characterized by wood engravings, zinc etchings, half tone plates and the like, and a third is a recess plate characterized by the steel plate, copper plate and the like. Because of the general use and well known characteristics of the half tone plate, I shall describe my invention with relation thereto, but it should be understood that my process is not limited to use with such plates.

Broadly speaking a picture consists in the selective location of dark and light areas which vary with respect to each other. The dark and light areas of a half tone plate are made by numerous raised portions in the form of dots which usually vary in size and all of which are in the same plane. This is said to be the tone of the picture. The dots of the half tone plate convey form as well as tone. The idea of conveying tone and form by the arrangement of dark and light areas is very well illustrated in pen and ink outline drawing, wherein the variations of a line from a straight course impresses the form of the original, while its width in places, as in shadows may be varied at the same time to give tone to the picture. So, in the half tone plate, the arrangement and size of the various dots determine the form as well as the tone.

Because of the practical difficulties encountered in producing printing plates, it is almost impossible to produce one which is all that is desired in tone, shading and form. Even though the picture plate be extraordinarily good in tone and form, it is extremely difficult to retain these qualities in the print. For instance, it is difficult to keep the high lights clear and to produce in the shadows just the proper tone. If stock is rough it is impossible to secure an accurate or faithful reproduction of the picture in the printing plate. The pressman often attempts to "help out," or increase the effectiveness of the picture, by placing what is known as an overlay on the impression cylinder of the press. This is made to be applied to the impression cylinder so as to register with the printing plate in the act of printing, whereby parts of the paper upon which are to appear the relatively darker portions of the print may be forced with greater pressure against the darker printing tones of the plate. This overlay is made of metal, or other relative incompressible material. It must be placed under several layers of make-ready paper in order to avoid serious injury to the printing plate. Another reason for placing the overlay under several layers of paper is to prevent the impression of sharp, harsh outlines of the overlay on the picture which would otherwise result. In this method of printing a tremendous pressure is required to secure any effect and then because of the remoteness of the overlay from the printing plate, and the interposition of numerous layers of make-ready paper, it is extremely difficult effectively to control the pressure so as to apply it to the exact portion desired, *i. e.*, heavy pressure throughout the darker tone areas and light pressure throughout the lighter tone areas or high lights. Even when an overlay is used, it is necessary to provide other means of securing pressure where desired. This is done by building up portions of the impression cylinder of the press with bits of paper. By this process of printing, which is almost universally used, the resulting print is somewhat improved, but not as much as desired because of the limitations stated.

The object of my invention is to produce more artistic prints from a given plate than is possible with processes hitherto devised.

Another object of my invention is to produce pictures from ordinary printing plates, which shall be clear in the high lights, full in the shadows and otherwise shaded in manner necessary to make a pleasing and artistic picture.

A special object of my invention is to produce from ordinary printing plates highly artistic pictures on rough or matted stock and further to produce pictures in simulation of water color or hand tinted pictures.

My invention consists generally in applying ink to the picture surface of a printing plate, subsequently moving an undulatory or relief yielding transferring surface into intimate relation thereto, whereby ink of different quantities is removed from different parts of the printing plate and subsequently pressing paper against the inked transfer surface with pressure of different predetermined intensity throughout different portions thereof, thereby selecting so much of the ink as is desired from the transfer surface, whereby the distribution of ink in the print is caused either to conform exactly to the values of the picture from which the plate is made, or to carry therefrom at will. My process may therefore be called a selective process of printing, inasmuch as I select or use only so much of the ink from the various parts of the printing plate as is necessary to approximate the desired effect and then select again from the transfer surface the ink in the exact quantities necessary to finally effect an highly artistic picture.

I have chosen to illustrate the process in several of the drawings in a very elementary way, in order that the fundamental principles upon which it depends may be clearly established in mind. It will then be easy to understand the various sorts of apparatus which may be used in practising the invention.

Figure 1 represents an ordinary half tone plate which bears upon its face a picture surface, reproductions of which are desired;

Fig. 2 represents a plate having a relief or undulatory surface which is used for the purpose of selecting so much ink from the printing plate as is necessary to approximate the desired effect in the picture;

Fig. 3 is a cross section thereof on the line 3—3 of Fig. 2;

Fig. 4 represents the plate shown in Fig. 2 with a piece of thin yielding or compressible material which is virtually a non-absorbent of ink, such as a good grade of sheet rubber, tightly stretched thereupon;

Fig. 5 is a cross section on the line 5—5 of Fig. 4 depicting the manner in which the yielding material substantially conforms to the undulations of the plate;

Fig. 6 represents the half tone plate upon a solid bed and the rubber covered undulator pressed against same by a uniform pressure upon the back to move it into ink selecting relation to the printing plate;

Fig. 7 is a cross sectional view similar to Fig. 5, greatly enlarged, depicting more clearly the manner in which the yielding material conforms to the undulations in the relief plate or undulator;

Fig. 8 is a cross sectional view substantially on the line 8—8 of Fig. 6, and drawn to the same scale as Fig. 7, showing the rubber-covered undulator in ink selecting relation to the half tone plate;

Fig. 8$^a$ is a greatly enlarged and somewhat exaggerated view of an inked half tone plate and a yielding undulator in ink selecting relation to the half tone plate;

Fig. 9 depicts the rubber-covered undulator after it is removed and has taken ink from the half tone plate;

Fig. 10 is an inverted cross section on line 10—10 of Fig. 9 showing clearly the distribution of ink thereon;

Fig. 11 represents a cross section of another undulator of the type shown in Fig. 2, but departing therefrom in a measure to select only a portion of the ink from the inked relief plate;

Fig. 12 shows the undulator of Fig. 11 on a solid bed, paper placed thereon, and the inked relief plate pressed against the paper;

Fig. 13 illustrates the paper with the distribution of ink thereon;

Fig. 14 is a greatly enlarged diagramatic view of a portion of a half tone plate;

Fig. 15 is a view of a print taken therefrom by my process and illustrating the manner in which the dots can be spread; and Figs. 16 and 17 are diagrammatic views illustrating printing machinery adapted for putting my process into commercial use.

Now referring particularly to Figs. 1 to 13, inclusive, which illustrate my process in elementary form, 1 represents an ordinary half tone printing plate. It has a printing surface 2, which is composed of a plurality of cylindrical stipples or dots varying in size and arrangement and which constitute a picture 3. 4 represents a relief plate substantially co-extensive with the half tone plate 1. It has a relief surface 5 which corresponds in form to a picture 3 of the plate 1. It has raised portions 6, depressed portions 7, and various intermediate portions 8 of relatively greater and lesser height. It may be called an undulator or relief plate and is used to bring out the tones of the picture in desired manner. There are many ways of making such a plate, but since they are so well known they need not here be described. Since such a plate is usually made of hard material, it is not desirable to press same directly against the printing plate. Therefore I cover same with thin yielding or compressible and elastic material 10, as indicated in Fig. 4. I find dental sheet rubber well adapted for this purpose, and shall refer to the same as dental rubber. This use of the term "dental rubber" is to be construed in the broad sense of any suitable elastic and yielding non-absorbent material. I wish it to be understood that my process contemplates the use of a relief plate without a rubber covering in which instance the relief plate is itself made of yielding material. But, because of the difficulty of producing a "yielding" relief plate, and the ease of producing a "hard" relief plate I prefer to use the "hard" relief plate and cover same with yielding material. As indicated in Fig. 5 and in the enlarged view (Fig. 7) the dental rubber substantially conforms to the undulations of the plate. It will not follow all the sharp depressions, however, and as shown in Fig. 7, will be slightly spaced therefrom at such places. The undulator and the rubber are greatly enlarged in all the drawings to disclose the invention more clearly. In ordinary practice this undulator or relief plate in its thickest portions is about the thickness of three-ply Bristol board. This fact should be kept in mind in reading all the drawings. Now the undulator may be pressed against the printing plate without danger of injuring same and without producing harsh form lines. The half-tone plate is inked and placed upon a solid bed. The relief plate or undulator is then moved by a uniform pressure applied to the back as indicated in Fig. 6, whereby it is brought into ink selecting relation to the printing plate. This relation is shown in Fig. 8. It will be seen that the half tone plate contains a plurality of dots or stipples 3ª which are all in the same plane and which form the picture. In applying ink to the plate it adheres uniformly to all of the stipples. The ink on each stipple is somewhat globular in shape. Now by moving certain portions of the undulator farther into the ink than other portions, I am able to pick up from the plate ink in different quantities. Thus at the high points 6, the greatest amount of ink will be removed, while at the lowest portions 7, which represent the high lights of the picture, no ink at all will be transferred, while at the intermediate portion 8, less ink than at the high points and more ink than at the low points, will be selected. This action will be more readily understood by reference to the greatly enlarged view Fig. 8ª. It will there be seen that the ink 3ª′ adhering to the stipples 3ª is somewhat globe shaped, all of the high points being in the same plane. At certain points 10′ yielding material 10 merely touches the ink, while at other points 10″ it enters a considerable distance into it. The lowest portion of the yielding material 10 bulges into the recesses 3ª″ between the stipples 3ª. I am able, if desired, to lift the ink out of the pockets by moving the undulator sufficiently close to the stipples 3ª and also to lift ink from the tops of the stipples. In this manner the half tone plate practically acts as a relief plate and as a recess plate. It should now be clear that the distance of the various portions of the relief plate from the inked half tone plate determine the amount of ink which will be transferred to the various portions thereof. I shall refer to this step of my process as placing the yielding transfer surface "into ink selecting relation to the printing plate." After removing the rubber-covered plate it contains ink, as indicated in Figs. 9 and 10. It may be that I have so accurately selected ink from the printing plate and transferred it to the rubber that it can be directly transferred to paper and produce a good print without further modification. Usually, however, I can improve the resulting print by a second selection of ink. Let us suppose that the print can be improved by omitting the ink dots 12 and 13, (Fig. 10) which dots extend too far into the high light of the picture as represented at 14. For this purpose I provide another relief plate or undulator, 15, of the same type as 4 but having a different relief surface. In this instance it has a flat portion 16 and a depressed portion 17. It is covered with dental rubber 15ª which conforms substantially thereto. The depressed portion 17 is located so that being placed against the inked plate 4 it is directly opposite the ink dots 12 and 13. As just stated, it is desired to transfer all the ink from the rubber 10 to paper excepting the dots 12 and 13. The manner of doing this is well shown in Fig. 12. The plate 15 is placed upon a solid bed, and paper placed thereon. The inked rubber covered plate is pressed against the paper. Pressure will be exerted where the paper is supported, as at 20 and 21, but not at 22 where the paper is not supported. The paper will sag or tend to conform to the depression 17 and hence will not touch the dots 12 and 13, but even should the paper touch the dots, pressure enough to transfer the same will be wanting. Therefore all the ink is transferred to the paper excepting dots 12 and 13, as shown in Fig. 13. It will be seen, therefore, that I select ink from the printing plate and then again select it from the rubber-coated relief plate. It is obvious that more steps of selection in same manner may be accomplished if desired, but for practical purposes two selections, as indicated, are sufficient to produce an artistic print. The transfer of ink from the transfer plate to the paper is more intimately controlled by the pressure applied, that is, I select ink from the transfer plate in desired amounts by exerting pressure of different predetermined intensity throughout different portions. I shall refer to this step of my process as applying "selective pressure."

As mentioned before, it is not practicable to print on rough or matted stock direct from a half tone plate. The reason for this is that the half tone plate is in a single plane while the rough paper is in many planes. To secure a good print on such paper, it is necessary, therefore, to flatten the paper against the plate. This requires so great pressure that it destroys the half tone plate in a few impressions and furthermore produces a blurred heavy print. With my process of printing, I am able to print on rough or matted stock with as great ease as upon smooth or calendered stock. This is obvious since I transfer the ink from the printing plate to the yielding plate and then transfer same to paper. The yielding material conforms very easily to the matted surface of the rough stock and from experiments which I have made, I find that the pressure required is approximately the same as that needed to print upon smooth stock. Another advantage of my process is that the printing plate will wear longer since it requires less pressure to transfer ink from metal to rubber or other similar material than it does to transfer ink from metal to paper.

My process as thus far described, while it improves the artistic aspect of the print is adapted to retain in the finished print the characteristics of the plate, that is, if it is a dotted half tone plate, the resulting print, while improved in tone, form and shading, will still retain the dot formation. It is well known that in producing plates by a photographic process it is necessary to break up the picture by means of a screen. This produces, as in the half tone, a plurality of dots or stipples. This, of course, is necessary in order to enable a distribution of ink thereon which can be transferred to the paper to produce the picture. In other words, if the plate were a continuous, flat surface and ink were applied thereto, the print struck therefrom would be a mere ink-covered print which would convey no form. Therefore it may be said that the continuous or gradually-changing tone of the photograph or picture, from which a half tone plate is made, is broken up in the half tone plate in order that it can be made and when made shall be capable of transferring ink to the paper in a manner to produce a picture. It is acknowledged that a photographic print is much more artistic than one reproduced from a half tone plate, but because of the slow methods of reproduction the cost thereof is prohibitive for commercial work. With my process, I am able to print from a half tone plate and reëstablish in the resulting print substantially the continuous tone of the picture from which the half tone plate was made. This will best be understood by reference to Figs. 12, 14 and 15. Fig. 14 represents a dotted formation of a half tone plate. As previously described, these dots are transferred to the rubber-covered relief plate by placing same into ink selecting relation to the half tone plate. By exerting the proper pressure in the transfer of ink from the rubber-covered relief plate to the paper, I am able to maintain the dots at substantially the same size. It follows logically that by exerting a greater pressure that the rubber will spread, thereby spreading the dots. The result of this is depicted in Fig. 15 where it will be seen that the spreading of the dots or the enlargement of each individual dot causes them to merge one with the other. Keeping in mind the fact that the ink dots as transferred by my process vary in tone value, *i. e.*, the amount of ink gradually diminishes toward the high lights, it should now be seen that the merging of these dots one with the other reëstablishes the gradual tonal change of the photograph or other picture from which the plate was made.

Now applying my process to color work, the results to be obtained are almost limitless. Printing on rough stock, as I can with my process and spreading the dots thereon, I am able to produce a colored print which resembles a water color or hand tinted picture.

Having thus described the process in elementary form, I shall briefly describe apparatus which can be used to put the same into commercial use.

Referring now to Fig. 16, 30 represents a printing cylinder having a printing plate 31 mounted thereon. The plate 31 corresponds to the half tone plate shown in Fig. 1. 32 represents a transfer cylinder and on this are mounted relief plates or undulators 33. The undulators 33 correspond to the relief plates shown in Fig. 2 and are used for the same purpose. Over the outer surface of the cylinder and relief plates, I stretch a thin rubber blanket 34. One end of the rubber blanket is suitably secured to the cylinder at 35 and the other end is wound upon a reel 36. By means of the reel, I am able to stretch the rubber very tightly over the surface of the cylinder and relief plates, in order that it may be made to conform to the undulations of the plate. 37 is an impression cylinder and is preferably covered with yielding material 38. The outer cylinders 30 and 37 are preferably operable from the intermediate cylinder 32. Thus when it is desired to print, the printing plate 31 is inked by rollers 40 and is brought into ink selecting relation to the intermediate cylinder 32. Paper is passed between the intermediate roll and the lower one and by shifting the impression cylinder toward the intermediate roll pressure is created to transfer ink from the rubber blanket 34 to the paper 41. In this form of the invention I have shown but one means of selecting the ink. That is, I select such ink as I may desire from the printing plate 31 and transfer all of this ink to the paper. For practical purposes, however, I find it better to provide means for selecting ink and then reselecting it in order to place the ink just where needed to produce the best picture. Apparatus for accomplishing this is illustrated in Fig. 17. The upper cylinder 30 contains a printing plate 31. The intermediate cylinder 32 is of the same construction as that shown in Fig. 16 having the rubber blanket 34 and the securing and stretching means 35 and 36, respectively. The relief plates 33 are also arranged on the cylinder for the purpose of selecting ink from the printing plate 31. The lower cylinder 42 is similar in construction to the intermediate cylinder 32, having a rubber blanket 43 which is secured at one end at 44 and attached at the other end to a reel 45. I also arrange one or more relief plates 46 on the surface of the cylinder. The three cylinders operate as a train through means of suitable intermeshing gears. Means are provided for moving the upper and lower cylinders to and from the intermediate cylinder. Thus ink applied to the printing plate 31 is selectively transferred to the blanket 34. The ink is transferred from the blanket 34 to the paper 41 by means of the lower cylinder which forcefully presents the paper thereto. All of the ink, however, is not transferred to the paper, but such only as is desired. This is predetermined by the form of the relief plates 36 under the rubber plate 43, which causes pressure of different intensity through different areas.

This brief description is all that is necessary in view of the full and complete detailed description given in reference to Figs. 1 to 15.

It is obvious, of course, that I could provide another cylinder and instead of selecting the ink one or two times, could select it three or more times before finally applying it to the paper, but for ordinary work such selection is not necessary. It is also obvious that instead of having the printing plate upon a cylinder, a flat reciprocating bed could be provided for the printing plate.

Having thus described my invention, I claim as new and desire to secure by Letters Patent:

1. A process of producing illustrations which consists in inking a commercial printing picture plate, pressing an undulatory yielding surfaced transfer plate of predetermined form against said inked plate and retracting it therefrom, with ink adhering to the undulatory plate in different amounts at the different portions according to the predetermined form thereof, and subsequently pressing paper against said inked undulatory plate by means of a yielding undulatory plate of predetermined form thereby forming an inked picture on the paper different from that on the undulatory transfer plate.

2. A process of producing illustrations which consists in uniformly inking a printing plate, pressing a yielding undulatory plate against said printing plate and retracting it therefrom, whereby ink in different amounts is caused to adhere to the various areas of the undulatory plate, and subsequently pressing paper against said inked undulatory plate by means of a yielding undulatory plate, whereby an inked picture is formed on the paper which is different from that which was formed on the undulatory plate by engagement with said printing plate.

3. A process of producing illustrations which consists in inking a commercial printing plate, pressing an undulatory surface transfer plate of predetermined form against the inked plate and retracting it therefrom with ink adhering to the undulatory plate in different amounts at the different portions according to the predetermined form thereof and subsequently pressing paper against said inked undulatory plate by means of an undulatory plate of certain predetermined form thereby forming an inked picture upon the paper different from that upon the undulatory transfer plate.

4. A process of producing illustrations which consists in uniformly inking a printing plate, pressing an undulatory plate against said printing plate and retracting it therefrom whereby ink in different amounts is caused to adhere to the various areas of the undulatory plate, and subsequently pressing paper against said inked undulatory plate by means of another undulatory plate whereby an inked picture is formed on the paper which is different from that which was formed upon the undulatory plate by engagement with said printing plate.

In testimony whereof, I have hereunto set my hand, this 15th day of June, 1912, in the presence of two subscribing witnesses.

THEODOR WENSEL.

Witnesses:
ARTHUR W. NELSON,
JOHN R. LEFEVRE.

Copies of this patent may be obtained for five cents each, by addressing the "Commissioner of Patents, Washington, D. C."